United States Patent
Hassell et al.

[11] 3,813,010
[45] May 28, 1974

[54] BEVERAGE DISPENSER

[75] Inventors: Davis A. Hassell, Coon Rapids; John R. McMillin, Maplewood, both of Minn.

[73] Assignee: The Cornelius Company, Minneapolis, Mich.

[22] Filed: Nov. 27, 1972

[21] Appl. No.: 309,947

[52] U.S. Cl............................ 222/129.1, 222/146 C
[51] Int. Cl............................................... B67d 5/56
[58] Field of Search............. 261/DIG. 7; 222/129.1, 222/129.2, 129.3, 129.4, 144.5, 145, 146 C

[56] References Cited
UNITED STATES PATENTS

| | | | |
|---|---|---|---|
| 2,612,304 | 9/1952 | Nissen.......................... | 222/129.4 X |
| 2,850,213 | 9/1958 | Cole............................. | 222/146 C X |
| 3,162,323 | 12/1964 | Kromer........................ | 222/146 C X |
| 3,209,952 | 10/1965 | Cornelius..................... | 222/129.1 |
| 3,565,405 | 2/1971 | Black............................ | 222/129.1 |
| 3,583,601 | 6/1971 | Agers........................... | 222/146 X |

*Primary Examiner*—Stanley H. Tollberg
*Assistant Examiner*—Larry Martin
*Attorney, Agent, or Firm*—Hill, Gross, Simpson, Van Santen, Steadman, Chiara & Simpson

[57] ABSTRACT

A combined carbonator-dispenser of post-mix beverages includes a storage tank for carbonated water in which a selected pressure of carbon dioxide gas is maintained, and to which still water is added which normally is at line pressure, through a flow control, and to which carbon dioxide gas is added at a still higher pressure. The still water and the carbon dioxide gas are combined in a mixer and the mixture passes through a turbulator enroute to such storage tank. The storage tank is refrigerated by a refrigerant line that encircles the tank in heat-exchange relation therewith, and the water line passes through the bore of the refrigerant line enroute to the mixer. The direction of water flow is counter to that of the refrigerant flow, and a portion of the water line and a portion of the refrigerant line are disposed above the uppermost level of carbonated water. A syrup line encircles the refrigerant line, there being one such syrup line for each flavor to be dispensed. The space above the carbonated water in the storage tank is directly coupled to the space above syrup in the syrup storage tank, so that any tendency for pressure to increase in one of such tanks is absorbed in part by the space above the liquid in the outer tank or tanks.

12 Claims, 5 Drawing Figures

BEVERAGE DISPENSER

BACKGROUND OF THE INVENTION

1. Field of the Invention

This invention pertains to a combined carbonator-dispenser for post-mix type of beverages.

2. Prior Art

Heretofore, in conventional carbonator constructions, a motor is normally utilized. Further, certain inefficiencies have been experienced in both degree of carbonation and degree of refrigeration of product. Further, when temperature has increased in the storage tank for carbonated water or in a syrup tank, it has been commonplace for the prior apparatus to vent carbon dioxide gas to the atmosphere and to thus waste it.

SUMMARY OF THE INVENTION

In accordance with the present invention, there is provided a combined carbonator-dispenser which is particularly efficient in carbonation and which normally operates without a pump, with reliance on the pressure from the water main. A T-mixer combines pressurized carbon dioxide gas with pressurized pre-cooled water and discharges through a turbulator into a pressurized storage tank. Precooling of the water is accomplished by having a portion of the water line disposed within a refrigerant line that is also in heat-exchange relationship with the storage tank and the syrup line. Further, all the syrup tanks and the storage tank have their spaces above their respective liquids connected together so that any pressure increase in any one of the tanks is shared by the others before any gas is vented to the atmosphere.

Accordingly, it is an object of the present invention to provide a combined carbonator-dispenser.

Another object of the present invention is to provide a beverage dispenser for post-mix beverages.

A still further object of the present invention is to increase the effective volume of gas space above a storage tank for minimizing waste of carbon dioxide gas.

Yet another object of the present invention is to provide a carbonator which will operate efficiently on water main pressure.

A still further object of the present invention is to provide means for preventing any carbon dioxide gas from entering the water system even if a check valve, provided for such purpose, should leak.

Yet another object of the present invention is to provide a particularly efficient heat exchange system for precooling water prior to its carbonation.

A still further object of the present invention is to provide a dispenser having a carbonator and refrigeration system that can be operated substantially continuously when required.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

ON THE DRAWINGS

AS SHOWN ON THE DRAWINGS

Figure 1:
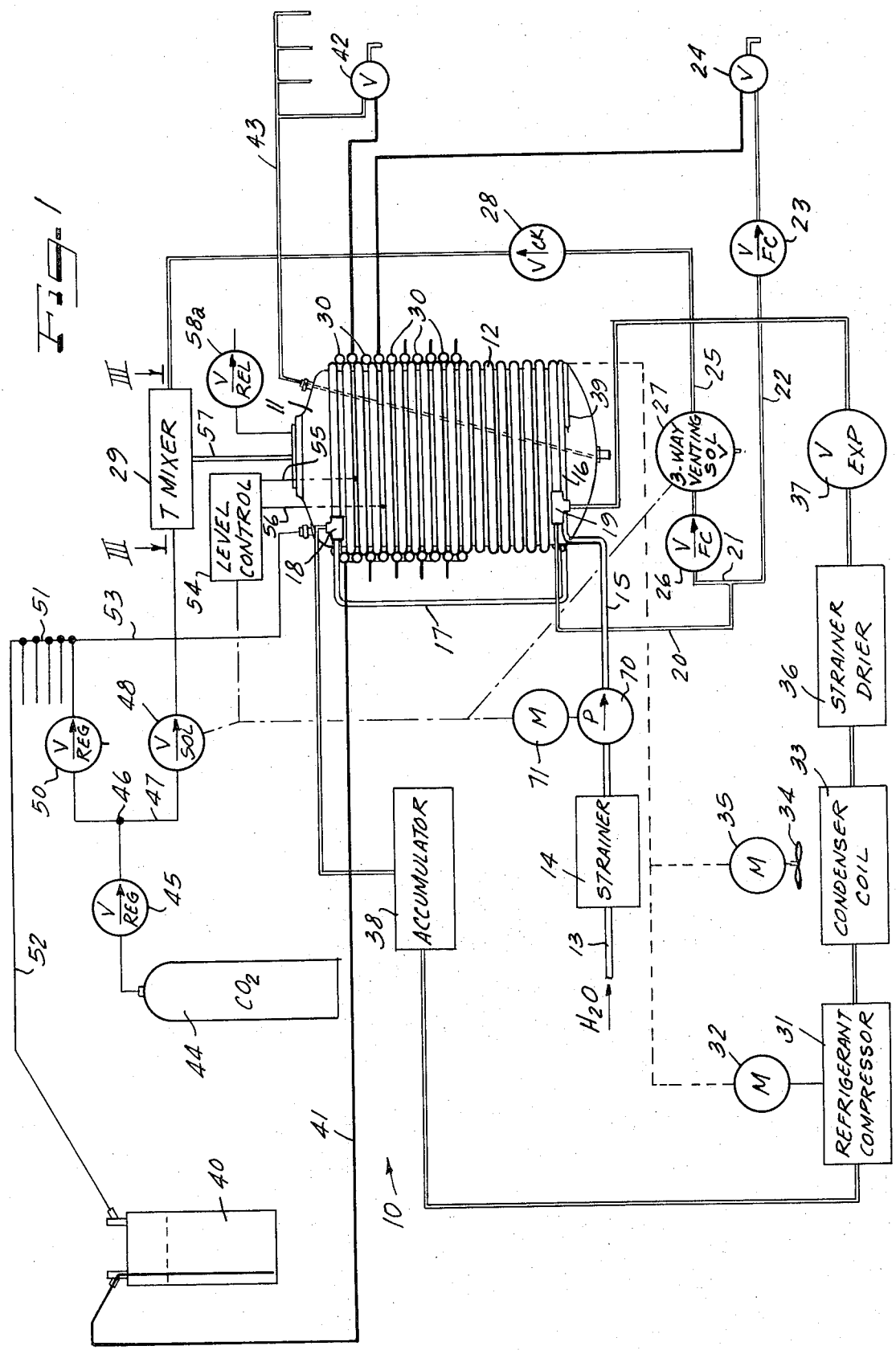
FIG. 1 is a diagrammatic view of a beverage dispenser provided in accordance with the present invention.
Figure 2:
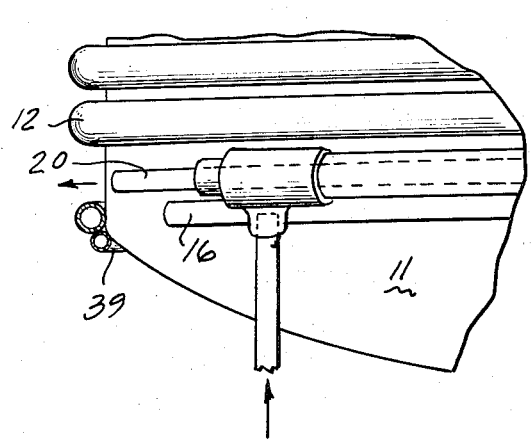
FIG. 2 is an enlarged fragmentary detail of structure shown in FIG. 1.

The principles of this invention are particularly useful when embodied in a beverage dispenser such as a combined carbonator-dispenser for mixing and dispensing beverages of the post-mix type such as shown in FIG. 1, generally indicated by the numeral 10. The dispenser 10 includes a storage tank 11 having a typical size of three gallons, and which is surrounded by a heat exchanger in the form of a regrigerant line 12 which is in heat-exchange relationship with the tank 11.

A source of still water 13 preferably comprises a domestic water main which, for the other parameters set forth later herein, should have a minimum pressure of 35 psi. The source of water is connected through a water strainer 14 to a water line 15 which makes a single loop 16 around the storage tank 11 and then passes upwardly through a portion 17, and then through a suitable fitting 18 into the interior of the refrigerant line 12, exiting through a similar fitting 19 and leading through a portion 20 to a T-fitting 21. A branch 22 of the water line 15 passes from the T-fitting 21 through a flow control valve 23 which permits water to flow therethrough at a rate of 1.3 ounces per second, the branch 22 then leading to a dispensing valve 24. The valve 24 may be of the manually operated or electrically operated type, as is known, and may also include an actuator for dispensing only refrigerated still water. The valve 24 is of the mixing type and in this embodiment mixes and dispenses a still drink. The other branch 25 of the water line 15 passes through a flow control valve 26 which permits water to flow therethrough at a rate of 0.2 ounces per second. The water flowing therethrough passes through a solenoid valve 27 and a check valve 28 to a T-mixer 29. In the event that carbon dioxide gas or carbonated water should flow reversely in the branch 25 of the water line, such reverse flow would be stopped by the check valve 28. In the event that such check valve would leak, a further protection is provided in that the solenoid valve 27 is of the three-way venting type. Therefore, the portion of the water line between the solenoid valve 27 and the check valve 28 is normally vented to atmosphere whenever the solenoid valve 27 is closed. The flow control valves 23, 26 each comprise means for maintaining a substantially constant flow rate. The size of the valve 26 has been selected so as to be matched with the refrigeration capacity of the refrigerant line or heat exchanger 12, so that on a continuous draw, the temperature increase is minimized to a tolerable level. In this embodiment, the refrigerant line has approximately a 0.44 inch inside diameter and comprises copper tubing, and the water line 15 therein also comprises copper tubing but which has a one-fourth inch outside diameter. With this construction, the refrigerant line 12 is in direct heat exchange relationship to the tank 11 and its refrigerant therein is in direct heat exchange relationship with the water line 15. Further, the refrigerant line 12 is in direct heat exchange relationship with each of a number of syrup cooling coils 30, there being five such syrup coils illustrated in this embodiment.

The refrigeration system includes a compressor 31 driven by a motor 32, the output of the compressor leading to a condenser coil 33 which is cooled by a fan 34 driven by a second motor 35. The refrigerant from the condenser coil passes through a strainer dryer 36 and through an automatic expansion valve 37 to the fitting 19. In this embodiment, the automatic expansion valve is set to control at 27 psi, and such setting provides a refrigerant temperature just above the freezing point of water. Refrigerant gas exits from the refrigerant line 12 through the fitting 18 and through an accumulator 38, back to the compressor 31. The compressor motor 32 is under the control of a thermostat 39 which is disposed in heat transfer relationship to the water coil 16 so that as soon as water is admitted to the coil 16, the refrigeration system promptly starts.

A source of syrup 40 comprising a pressurized syrup supply tank is connected to a syrup line 41 which leads through one of the syrup coils 30 and thence to one of four mixing valves 42 which are identical to the mixing valve 24, only one of the valves 42 being shown. The valves 42 are connected to a carbonated water line 43 which leads to the bottom of the storage tank 11. Each of the valves 24, 42 is of the type that has an adjustment screw for adjusting the effective size of the syrup passage whereby the Brix may be appropriately regulated at each of such valves 24, 42.

The dispenser 10 is adapted to be connected to a source of carbon dioxide gas 44 which is connected to a primary pressure regulator valve 45 hereinafter referred to as the second pressure regulator valve which typically is set to discharge gas at a pressure of 80 psi. The pressure regulator valve 45 is connected to a T-fitting 46 wherein the flow of gas divides through a gas line 47 leading to a solenoid valve 48 and thence to the T-mixer 29. The other branch of the gas line leads to a secondary pressure regulator 50 hereinafter referred to as the first pressure regulator valve which operates at a selected pressure such as 25 psi. The output of the secondary regulator 50 leads to a brass manifold 51 which has five outlets that respectively lead to five syrup tanks 40 through lines such as 52. The manifold 51 is further connected through a line 53 to the storage tank 11.

By the foregoing arrangement, carbon dioxide gas at the selected pressure is present in the space above the syrup in each of the syrup tanks 40 and is also present in the space above the liquid in the storage tank 11. If the pressure in any one of the tanks should rise, that pressure increase is thus spread to the spaces above the liquid in the other tanks. After all those spaces have had a pressure increase of 4 psi, the excess will be vented to the atmosphere by the pressure regulator 50 which is of the bleed-off type. When the pressure has decreased to a value 4 psi above the set pressure, bleeding off will terminate. Thus a substantially constant pressure is provided to propel the liquids out of the various tanks to the various mixing valves 24, 42.

The storage tank 11 is provided with a level control 54 which has an electrode 55 for determining the upper limit of water level therein and a second electrode 56 for determining the lower limit of water therein. The electrode 56 is thus responsive to the lower limit of water to effect refilling of the storage tank 11 and the upper electrode 55 is responsive to the upper level to effect termination of such refilling. In this embodiment, the differential between the electrodes 55 and 56 is approximately 15 ounces. When water is to be added, the level control 54 energizes the solenoid valve 48 to admit carbon dioxide gas at 80 psi to the T-mixer 29 and also energizes the three-way venting solenoid valve 27 to admit precooled water at the rate of 0.2 ounces per second to the T-mixer 29. The T-mixer 29 discharges mixed water and carbon dioxide gas to a mixing line 57. When the valves 48, 27 are energized water begins to flow through the anticipation loop or coil 16, thus causing the thermostat 39 to turn on the refrigeration system. The refrigerant flows from the fitting 19 to the fitting 18 while the water counter flows, flowing from the fitting 18 to the fitting 19. As the water flows from the heat anticipation loop or coil 16 through the portion 17 to the fitting 18, it passes through at least two loops of the refrigerant line 12 that are disposed above the upper level of the water which thus may be at a temperature or which may thus take on a temperature above that of the stored carbonated water without heating such water, thereby also maximizing the thermal use of the refrigerant.

A relief valve 58 is connected to the tank 11 and is set to relieve at a pressure more than four pounds above the set pressure of the pressure regulator 50. The relief valve 58a thus is a safety device to protect against a rapid pressure increase in the tank 11, such as one that could not be safely handled by the gas line 53.

Figure 3:
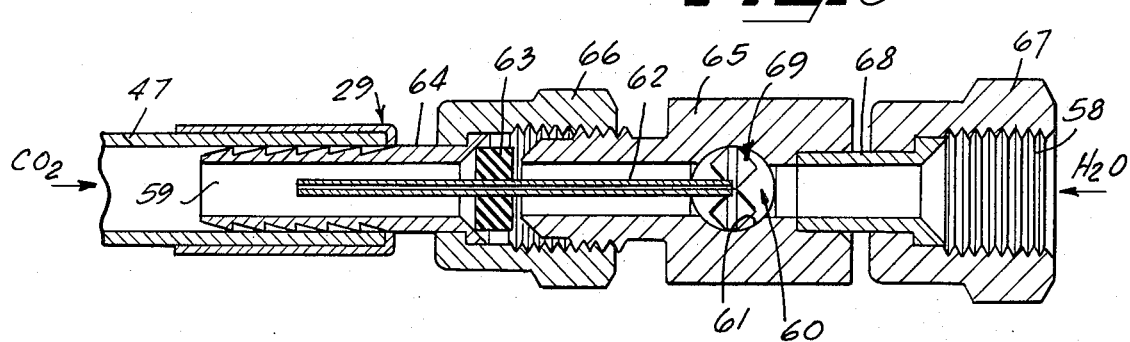
FIG. 3 is an enlarged cross-sectional view taken along line III—III of FIG. 1.

The T-mixer 29 is shown in greater detail in FIG. 3.

The T-mixer 29 has a water inlet 58 connected to the water line branch 25 and a gas inlet 59 connected to the gas line 47, inlets 58,59 leading to a mixing zone generally indicated at 60 which leads to an outlet 61 connected to the mixing line 57. Within the T-mixer 29 there is disposed a length or piece of tubing 62 which has a restricted bore. In this embodiment, the tubing 62 is of stainless steel, has a length of 1½ inches, and has an inside diameter of 0.010 inch. The tubing 62 is clamped along its length by a rubber grommet 63 that is clamped between a gas inlet fitting 64 and a T-block 65 by a nut 66. The tubing 62 maintains a substantially constant pressure drop thereacross and thus there is a constant pressure at the mixing zone 60. A nut 67 is rotatably trapped on a ferrule 68 which is secured to the T-block 65. When the nut 66 is tightened, the rubber grommet 63 compresses about and securely holds the tubing 62.

Figure 4:
FIG. 4 is an enlarged view of a turbulator used in the system of FIG. 1.
Figure 5:
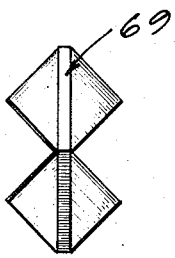
FIG. 5 is a still further enlarged end view of the turbulator of FIG. 4.

Within the mixing line 57 there is disposed a turbulator 69 shown in FIGS. 4 and 5. The inside diameter of the mixing line 57 typically is 0.156 inch and such mixing line 57 preferably comprises vinyl tubing. The turbulator 69 is substantially coextensive with the mixing line 57 and in this embodiment is about 8 inches long. The geometric configuration of the turbulator 69 can best be understood by a brief description of how it is made. Begin with a flat strip of stainless steel approximately 8 inches long, a little less than 0.156 wide and approximately 0.010 inch thick. At intervals along the length which are approximately the width of the strip, cut a slit halfway through the width, first from one side and then from the other side in an alternate fashion. Then at each slit, bend down one of the corners thus formed and bend up the other corner. The resulting device is shown in FIGS. 4 and 5, FIG. 5 being an enlarged end view of the structure of FIG. 4. The turbulator 69 increases the rate of carbonation so that the discharge therefrom at the values given will have a level of carbonation between 3.4 and 3.9 volumes of carbon dioxide gas for each volume of water. This is an excellent degree of carbonation for the parameters given because if the system is permitted to stand until carbonation is completely stable, it will rise to only about 4.1 volumes of $CO_2$ in the water in the tank 11.

For the parameters set forth, it will take 30 minutes to fill the storage tank 11 to shut off, but after about 5 minutes, dispensing of servings of beverage can begin.

Assuming that the system is operating in an ambient temperature of 75° and with water of that temperature, the device described can dispense 450 6-ounce drinks at the rate of four per minute before the tank is empty without any serving having a temperature exceeding 40° F. In this example, carbonated water is withdrawn at the rate of 15 ounces per minute while refilling takes place at 12 ounces per minute, leaving a net loss of 3 ounces per minute until the tank is empty.

Another example of operation is that 70 6-ounce drinks, namely 420 ounces of serving can be withdrawn in one continuous draw without exceeding acceptable temperature limits.

In the event that the dispenser 10 is to be utilized at a location where the water pressure coming from the water main is less than 35 psi, then a pump 70 can be added which is driven by a motor 71 connected to be energized by the level control 54 with the solenoid valves 27, 48. Ordinarily, the pump 70 is unnecessary.

Although various minor modifications might be suggested by those versed in the art, it should be understood that I wish to embody within the scope of the patent warranted hereon, all such embodiments as reasonably and properly come within the scope of my contribution to the art.

I claim as my invention:

1. A combined carbonator-dispenser, comprising:
   a. a storage tank for carbonated water, said tank being arranged to be pressurized by a source of carbon dioxide gas under the control of a first pressure regulating valve to a selected first pressure;
   b. a dispensing faucet connected to said storage tank to receive carbonated water therefrom;
   c. a water line arranged to be connected to a pressurized supply of still water having a second pressure higher than said first pressure;
   d. a gas line arranged to be connected to a pressurized supply of carbon dioxide gas under the control of a second pressure regulating valve for producing a third pressure higher than said first pressure;
   e. a T-mixer having water and gas inlets connected respectively to said water and gas lines, and leading to a mixing zone therein, and an outlet leading therefrom; and
   f. a mixing line leading from said mixing zone to said storage tank.

2. A combined carbonator-dispenser according to claim 1 which includes a check valve in said water line to prevent reverse flow of carbon dioxide gas therethrough, and a three-way venting valve in said water line upstream of said check valve for venting the portion of said water line between said check valve and said three-way valve to the atmosphere whenever said check valve and three-way valve are closed, whereby any gas leakage past the closed check valve cannot flow into the water supply.

3. A combined carbonator-dispenser according to claim 1 which includes a pair of valves disposed in said water line and said gas line, and a level control responsive to the level of carbonated water in said tank for controlling said pair of valves to maintain the liquid level in said tank between predetermined upper and lower limits.

4. A combined carbonator-dispenser according to claim 1 including means for refrigerating said water line, and a flow-rate control valve in said water line sized to limit the volumetric rate of water flow therethrough based on the refrigerating capacity of said refrigerating means, whereby only an acceptable temperature rise of refrigerated water occurs during steady dispensing.

5. A combined carbonator-dispenser according to claim 1 in which said water and gas inlets in said T-mixer have bores facing each other which are unrestricted therebetween.

6. A combined carbonator-dispenser according to claim 1 which includes a length of tubing of restricted bore size, smaller than the bore size of the water inlet, connecting said gas inlet to said mixing zone.

7. A combined carbonator-dispenser according to claim 1 which includes a tubulator disposed in and extending along a length of said mixing line.

8. A combined carbonator-dispenser according to claim 1 which includes means disposed in said gas line between said second pressure regulator and said tank for maintaining a substantially constant pressure drop, and means in said water line for maintaining a substantially constant flow rate therethrough.

9. A combined carbonator-dispenser according to claim 1 which includes a syrup supply tank connected by a syrup line to said dispensing faucent, said faucet being of the mixing type, and a pressure regulator valve having an inlet for being connected to receive pressurized carbon dioxide gas at said third pressure, and an outlet connected directly to said syrup supply tank and to said storage tank to provide said selected first pressure, whereby the gas-filled space above the liquid in either tank has an effective volume of both said spaces.

10. A combined carbonator-dispenser according to claim 1 in which said second pressure regulating valve and said gas line regulate said third pressure to be higher at the T-mixer gas inlet than said second pressure.

11. A combined carbonator-dispenser, comprising:
   a. a storage tank for carbonated water, said tank being arranged to be pressurized by a source of carbon dioxide gas under the control of a first pressure regulating valve to a selected first pressure;
   b. a dispensing faucet connected to said storage tank to receive carbonated water therefrom;
   c. a water line arranged to be connected to a pressurized supply of still water having a second pressure higher than said first pressure;
   d. means in said water line for maintaining a substantially constant flow rate therethrough;

e. a gas line arranged to be connected to a pressurized supply of carbon dioxide gas under the control of a second pressure regulating valve for producing a third pressure higher than said first pressure;

f. means disposed in said gas line between said second pressure regulator and said tank for maintaining a substantially constant pressure drop;

g. a mixer having water and gas inlets connected respectively to said water and gas lines, and leading to a mixing zone therein, and an outlet leading therefrom; and h. a mixing line leading from said mixing zone to said storage tank.

12. A post-mix beverage dispenser, comprising:

a. a refrigerated storage tank for storing carbonated water;

b. a dispensing faucet of the mixing type connected to said storage tank to receive carbonated water therefrom;

c. a syrup supply tank remote from said storage tank and connected by a syrup line to said dispensing faucet; and d. a pressure regulator valve having an inlet for being connected to receive pressurized carbon dioxide gas, and an outlet connected directly by a continually open lines to said syrup supply tank and to said storage tank to pressurize said tanks, whereby the gas-filled space above the liquid in either tank has an effective volume equal to the combined volume of both of said spaces whereby the pressure increase due to any temperature increase is minimized.

* * * * *